US010956153B2

(12) United States Patent
Neatherway (10) Patent No.: US 10,956,153 B2
(45) Date of Patent: *Mar. 23, 2021

(54) VIOLATION MATCH SETS

(71) Applicant: Microsoft Technology Licensing, LLC, Redmond, WA (US)

(72) Inventor: Robin Neatherway, Oxford (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,735

(22) Filed: Sep. 30, 2019

(65) Prior Publication Data
US 2020/0133664 A1    Apr. 30, 2020

Related U.S. Application Data

(63) Continuation of application No. 15/792,447, filed on Oct. 24, 2017, now Pat. No. 10,430,184.

(51) Int. Cl.
*G06F 8/77*  (2018.01)
*G06F 8/71*  (2018.01)
*G06F 11/36*  (2006.01)
*G06F 8/75*  (2018.01)

(52) U.S. Cl.
CPC .......... *G06F 8/77* (2013.01); *G06F 8/71* (2013.01); *G06F 8/75* (2013.01); *G06F 11/3692* (2013.01)

(58) Field of Classification Search
None
See application file for complete search history.

(56) References Cited

U.S. PATENT DOCUMENTS

| 8,032,863 | B2  | 10/2011 | Kolawa et al. |
| 8,356,278 | B2  | 1/2013  | Drissi et al. |
| 9,195,566 | B2  | 11/2015 | Huang et al. |
| 9,208,056 | B1* | 12/2015 | Henriksen ........... G06F 11/3616 |

(Continued)

OTHER PUBLICATIONS

"Non-Final Office Action Issued in U.S. Appl. No. 14/565,314", dated Dec. 24, 2015, 13 Pages.

(Continued)

*Primary Examiner* — Qing Chen
(74) *Attorney, Agent, or Firm* — Workman Nydegger (57) ABSTRACT

Methods, systems, and apparatus, including computer programs encoded on computer storage media, for attributing violation introductions and removals. One of the methods includes receiving a request to compute a number of violation introductions attributable to a particular developer entity in a plurality of ancestor snapshots of an original snapshot in a revision graph of a code base. A respective match set for each of a plurality of violations occurring in the plurality of ancestor snapshots of the original snapshot are computed, wherein each match set for a particular violation in a particular snapshot includes any transitively matching violations in the ancestor snapshots of the particular snapshot that transitively match the particular violation. A count of unique match sets having at least one violation that was introduced by the particular developer entity is computed. The number of unique match sets is provided in response to the request.

9 Claims, 5 Drawing Sheets

(56) References Cited

U.S. PATENT DOCUMENTS

| | | | |
|---|---|---|---|
| 9,262,157 B2 | 2/2016 | Henriksen et al. | |
| 9,305,279 B1 | 4/2016 | Menzel | |
| 9,411,578 B2 | 8/2016 | Henriksen et al. | |
| 9,411,579 B2 | 8/2016 | Henriksen et al. | |
| 9,507,590 B2 | 11/2016 | Henriksen et al. | |
| 9,507,591 B2 | 11/2016 | Henriksen et al. | |
| 9,639,353 B1 | 5/2017 | Henriksen et al. | |
| 9,645,817 B1 | 5/2017 | Van Schaik | |
| 9,652,226 B2 | 5/2017 | Henriksen et al. | |
| 9,658,839 B2 | 5/2017 | Hale et al. | |
| 9,690,690 B1* | 6/2017 | Henriksen | G06F 11/3692 |
| 2014/0344788 A1 | 11/2014 | Rhoads | |
| 2015/0309790 A1* | 10/2015 | Henriksen | G06F 8/43 717/121 |
| 2015/0324195 A1 | 11/2015 | Henriksen et al. | |
| 2016/0098271 A1 | 4/2016 | Henriksen et al. | |
| 2016/0132326 A1 | 5/2016 | Henriksen et al. | |
| 2016/0140015 A1* | 5/2016 | Baars | G06F 11/3604 717/132 |
| 2016/0162288 A1 | 6/2016 | Henriksen et al. | |
| 2016/0162289 A1* | 6/2016 | Henriksen | G06F 11/3604 717/123 |
| 2016/0162388 A1* | 6/2016 | Henriksen | G06F 8/433 717/124 |
| 2017/0235664 A1* | 8/2017 | Henriksen | G06F 11/3616 717/122 |
| 2018/0095746 A1* | 4/2018 | Henriksen | G06F 8/75 |

OTHER PUBLICATIONS

"Non-Final Office Action Issued in U.S. Appl. No. 14/577,892", dated May 18, 2015, 8 Pages.

"Final Office Action Issued in U.S. Appl. No. 14/983,133", dated Oct. 13, 2016, 14 Pages.

"Non-Final Office Action Issued in U.S. Appl. No. 14/983,133", dated Apr. 29, 2016, 15 Pages.

"Final Office Action Issued in U.S. Appl. No. 14/983,175", dated Jan. 03, 2017, 12 Pages.

"Non-Final Office Action Issued in U.S. Appl. No. 14/983,175", dated Mar. 24, 2016, 13 Pages.

"Notice of Allowance Issued in U.S. Appl. No. 14/983,175", dated Jan. 17, 2017, 10 Pages.

"Notice of Allowance Issued in U.S. Appl. No. 15/583,026", dated Jun. 21, 2017, 15 Pages.

"Extended Search Report issued in European Patent Application No. 15196029.1", dated Mar. 9, 2016, 8 Pages.

"Office Action Issued in European Patent Application No. 15196029.1", dated Dec. 23, 2016, 5 Pages.

Corley, et al., "Recovering Traceability Links Between Source Code and Fixed Bugs Via Patch Analysis", In Proceedings of the 6th International Workshop on Traceability in Emerging Forms of Software Engineering, May 23, 2011, pp. 31-37.

Sisman, et al., "Incorporating Version Histories in Information Retrieval Based Bug Localization", In 9th IEEE Working Conference on Mining Software Repositories (MSR), Jun. 2, 2012, pp. 50-59.

Wang, et al., "Version History, Similar Report, and Structure: Putting Them Together for Improved Bug Localization", In Proceedings of the 22nd International Conference on Program Comprehension, Jun. 2, 2014, pp. 53-63.

* cited by examiner

VIOLATION MATCH SETS

CROSS-REFERENCE TO RELATED APPLICATION

This application is a continuation of U.S. application Ser. No. 15/792,447, filed Oct. 24, 2017, the contents of which are herein incorporated by reference.

BACKGROUND

This specification relates to static analysis of computer software source code. Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot includes the source code of files of the code base as files existed at a particular point in time.

Snapshots stored in a version control system can be represented as a directed, acyclic revision graph. Each node in the revision graph represents a commit of the source code. A commit represents a snapshot as well as other pertinent information about the snapshot such as the author of the snapshot, and the data about ancestor commits of the node in the revision graph. A directed edge from a first node to a second node in the revision graph indicates that a commit represented by the first node is a commit preceding a commit represented by the second node, and that no intervening commits exist in the version control system.

Branching is the process of making a copy of a snapshot of the code base that is developed independently. Thus, subsequent modifications on the new branch do not affect later commits on the previous branch. Merging is the process of incorporating two branches into a single branch. Branching and merging processes allow parallel development to occur along multiple versions of the code base. The developed features can then be merged back together at a later time. Developers working in parallel on different branches can create new features in the branches. Branches that are used to create such new features may thus be referred to as feature branches.

Aspects of static analysis include attributing source code contributions and generating data representing trends in code bases. Attributing source code contributions means attributing changes introduced by a snapshot to a particular developer entity responsible for committing the snapshot. A developer entity can be a single developer or a group of multiple developers. For example, a developer entity can be a lone developer, developers on a team, developers within an organization or within a department of an organization, or any other appropriate group of developers.

Accurately attributing source code contributions can be difficult for real-world code bases that have multiple branches. As one example, consider three branches having three instances of the same violation. If a developer entity implements the same fix in all three branches and then merges the branches, the developer entity may be credited with fixing three problems in the code base, even though the developer entity only fixed one problem.

SUMMARY

A static analysis system can use match sets of violations to improve the accuracy of attributing violation introductions and removals. When using match sets, matching violation introductions from two or more branches of a source code repository that are merged back together in a source code repository are attributed only once to each developer that was responsible for at least one introduction point. Conversely, the system can also improve violation removal attribution by using match sets so that violation removals from two or more branches of a source code repository are only attributed once to each developer that was responsible for at least one removal point for a violation in the match set.

Particular embodiments of the subject matter described in this specification can be implemented so as to realize one or more of the following advantages. Using match sets helps to avoid blaming developers for multiple introductions of violations that are actually the same, and avoids giving developers too much credit for fixing multiple instances of the same violation. Match sets combine transitively matched violations across branches of the source code to create a complete set of all the revisions in which a violation exists or existed. The static analysis system can use this complete set to determine violation introduction attributions and removals. An example system uses match sets to uniquely identify transitively matched violations across branches. These match sets are helpful to determine appropriate attribution for violation introductions and removals. Although a violation can have multiple introduction and removal points, each introduction or removal point can be properly attributed by determining the introduction and removal points using transitively matched violations and then connecting the transitively matching violation paths across branches.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system can obtain more accurate attribution results using match sets, which are sets of violations across multiple branches that can be transitively matched. A match set can be used to determine how many violations have actually been introduced or removed for a given source code revision across all branches of a code base.

Figure 1:
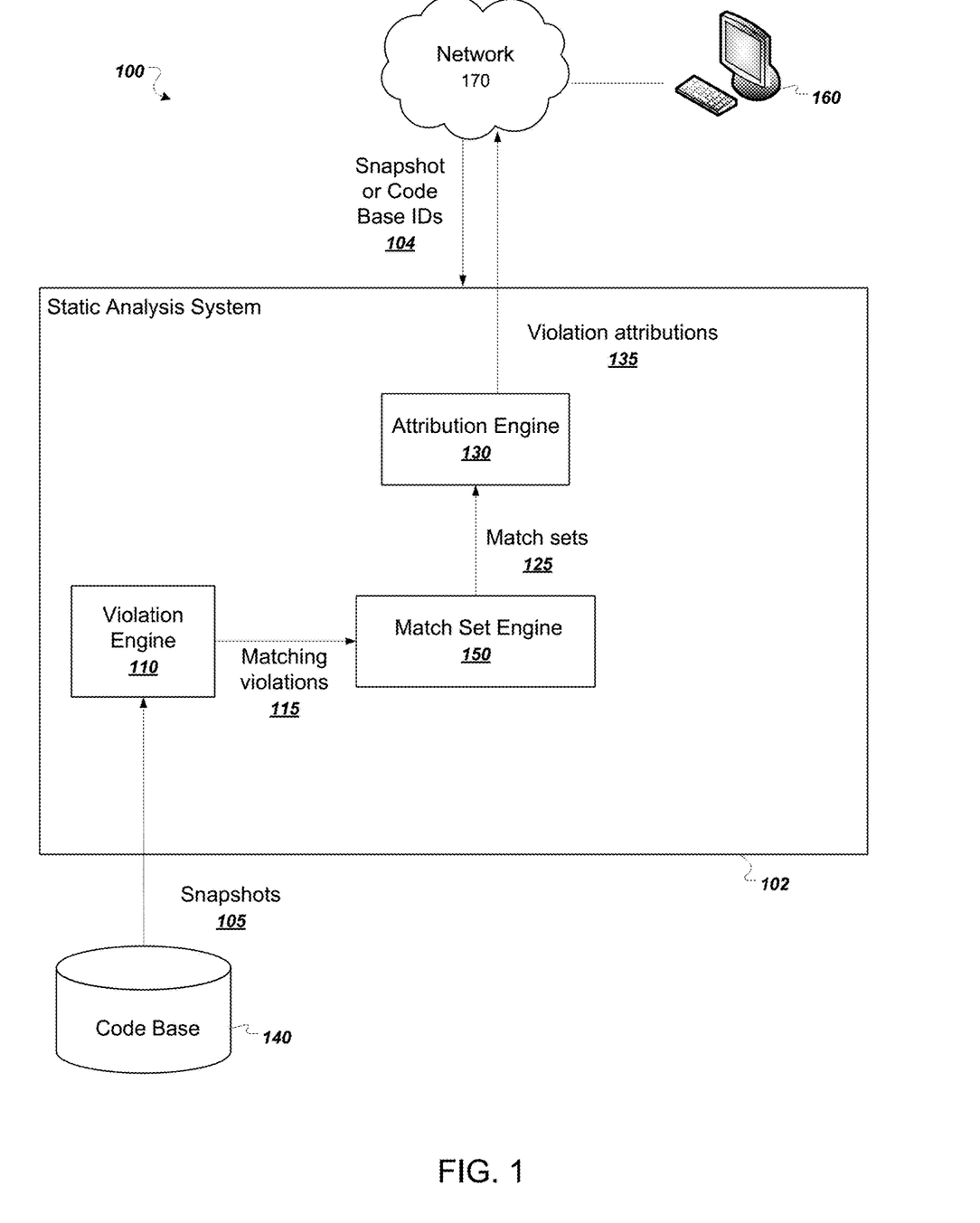
FIG. 1 illustrates an example system.

FIG. 1 illustrates an example system 100. The system 100 includes a user device 160 in communication with a static analysis system 102 over a network 170. The static analysis system 102 includes several functional components, including a violation engine 110, an attribution engine 130, and a match set engine 150. The components of the static analysis system 102 can be implemented as computer programs installed on one or more computers in one or more locations that are coupled to each other through a network. Alternatively, the static analysis system 102 can be installed in whole or in part on the user device 160.

A user of user device 160 can initiate static analysis of snapshots of the code base 140. The user device 160 can communicate with the static analysis system 102 over the network 170, which can be any appropriate data communications network, e.g., one that includes an intranet or the Internet. For example, a user of user device 160 can specify one or more snapshot or code base identifiers 104 for analysis. The user of user device 160 can also communicate with the static analysis system 102 in order to specify or customize the coding standards that define coding violations.

Upon the user of user device 160 specifying the snapshot or code base IDs 104 for static analysis, the violation engine 110 receives the selected snapshots 105 from the code base 140, e.g., a parent snapshot and a child snapshot.

The violation engine 110 can identify violations that occur in the snapshots 105 and can identify which violations match between adjacent snapshots. The violation engine 110 can also compute transitively matched violations that represent a same coding defect occurring in each of an unbroken sequence of snapshots. For example, a first violation in a first snapshot can represent a coding defect that was introduced by a developer in the first snapshot. The coding defect is then not removed until a sequence of snapshots have been committed to the code base. The system can then identify the first violation as transitively matching each violation occurring in the sequence of snapshots. Thus, a sequence of transitively matching violations can represent the lifecycle of a coding defect in the code base. The transitively matched violations can include information about violations representing when the coding defect first occurred and last occurred. Techniques for computing transitively matching violations are described in commonly owned U.S. Pat. No. 9,507,590, entitled "Transitive Source Code Violation Matching and Attribution," which is herein incorporated by reference.

The violation engine 110 can then provide matching violations 115 to the match set engine 150. Alternatively, the matching violations 115 can be obtained from other sources.

The match set engine 150 can determine match sets 125 from the matching violations 115, using transitive matching of violations.

A match set of a violation in a particular snapshot is a set of violations containing the violation and all violations in all ancestor snapshots of the particular snapshot that transitively match the violation in the particular snapshot. A match set can contain as few as one matching violation on a single branch of a revision graph. A match set can alternatively or additionally contain violations from multiple branches of the revision graph. In other words, a match set for a particular violation can contain violations that transitively match the violation from multiple paths in the revision graph.

The attribution engine 130 receives the match sets 125 from the match set engine 150 and attributes one or more violation introductions or removals a particular developer or to a particular snapshot. When using match sets, the attribution engine 130 attributes, to a developer, a single violation introduction or removal if the developer is responsible for any introduction point or removal point of a violation in the match set. Using match sets helps to avoid blaming developers for violations that are actually the same, and avoids giving developers too much credit for fixing multiple instances of the same violation.

At this point, the static analysis system 102 can provide the violation attributions 135 back to the user device 160, e.g., over the network 170.

Figure 2:
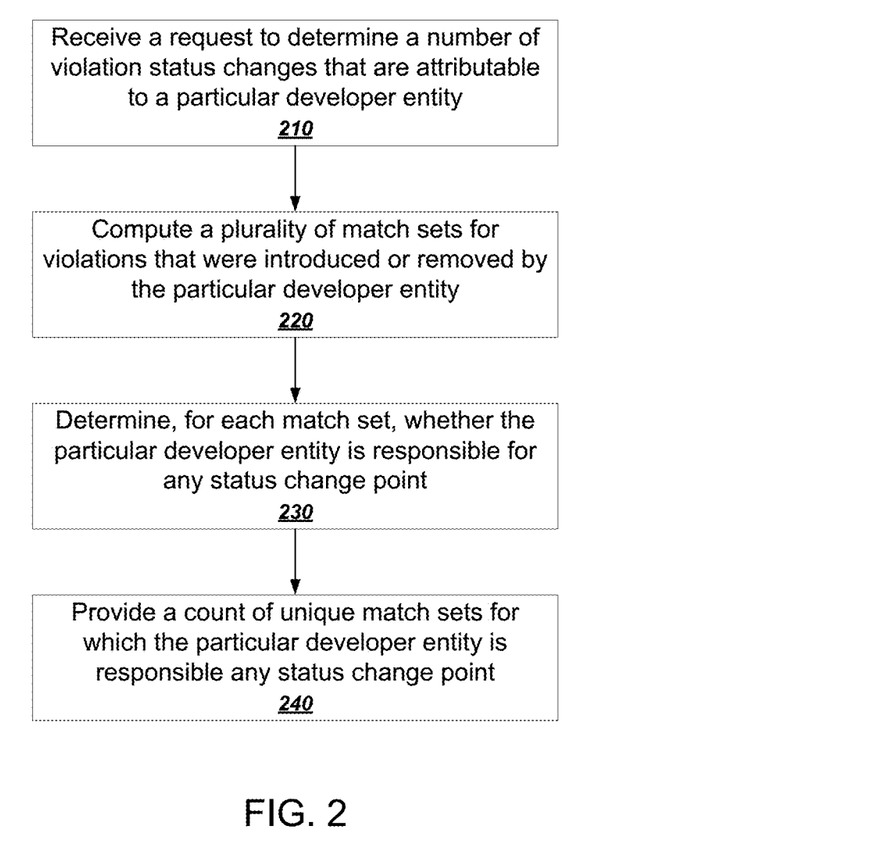
FIG. 2 is a flow chart of an example process for attributing violation status changes.

FIG. 2 is a flow chart of an example process for attributing violation status changes. The process can be implemented by one or more computer programs installed on one or more computers. The process will be described as being performed by an appropriately programmed system of one or more computers, e.g., the static analysis system 102 of FIG. 1.

The static analysis system receives a request to determine a number of violation status changes that are attributable to a particular developer entity (210). The request can identify implicitly or explicitly a particular starting snapshot from which to begin the analysis. In that respect, the request is akin to a request to compute the developer entity's contributions to the status of the code base represented by the starting snapshot. In some cases, by default the system uses, as the starting snapshot, the most recent snapshot of a code base. Alternatively or in addition, the system can use the most recent snapshot of a code base on a main branch of the revision graph, even if modified less recently than other snapshots on feature branches of the revision graph.

The request can also identify implicitly or explicitly a particular ending point. If no end point is specified, the system can use the entire history of the code base. Otherwise, the system can use data only back to a particular point in the revision graph to back to a particular point in time.

The system then computes a plurality of match sets for violations that were introduced or removed by the particular developer entity (220). To do so, the system can process snapshots identified by the request to compute transitive violation matching information. The system can precompute the transitive matching violation information or compute the transitive matching violation information after the request is received.

In general, the transitive violation matching information can indicate, for each violation, one or more other violations in ancestor snapshots that transitively match the violation. The system can then compute a match set by computing a set union of all of the violations that transitively match the violation. Thus for a particular violation occurring in a particular snapshot, the system can compute a match set having all violations occurring in any ancestor snapshots that transitively match the particular violation.

In some implementations, the system can represent transitive matching violation information in a more compact way. For example, the system can represent a transitively matched violation as a tuple that identifies the first snapshot in which the coding defect occurred and the last snapshot in which the coding defect occurred without explicitly identifying all of the intervening violations or snapshots between the first and last. Techniques for compactly representing transitive violation matching information are described in commonly owned U.S. Pat. No. 9,690,690, entitled "Scalable Transitive Violation Matching," which is herein incorporated by reference.

Figure 3:
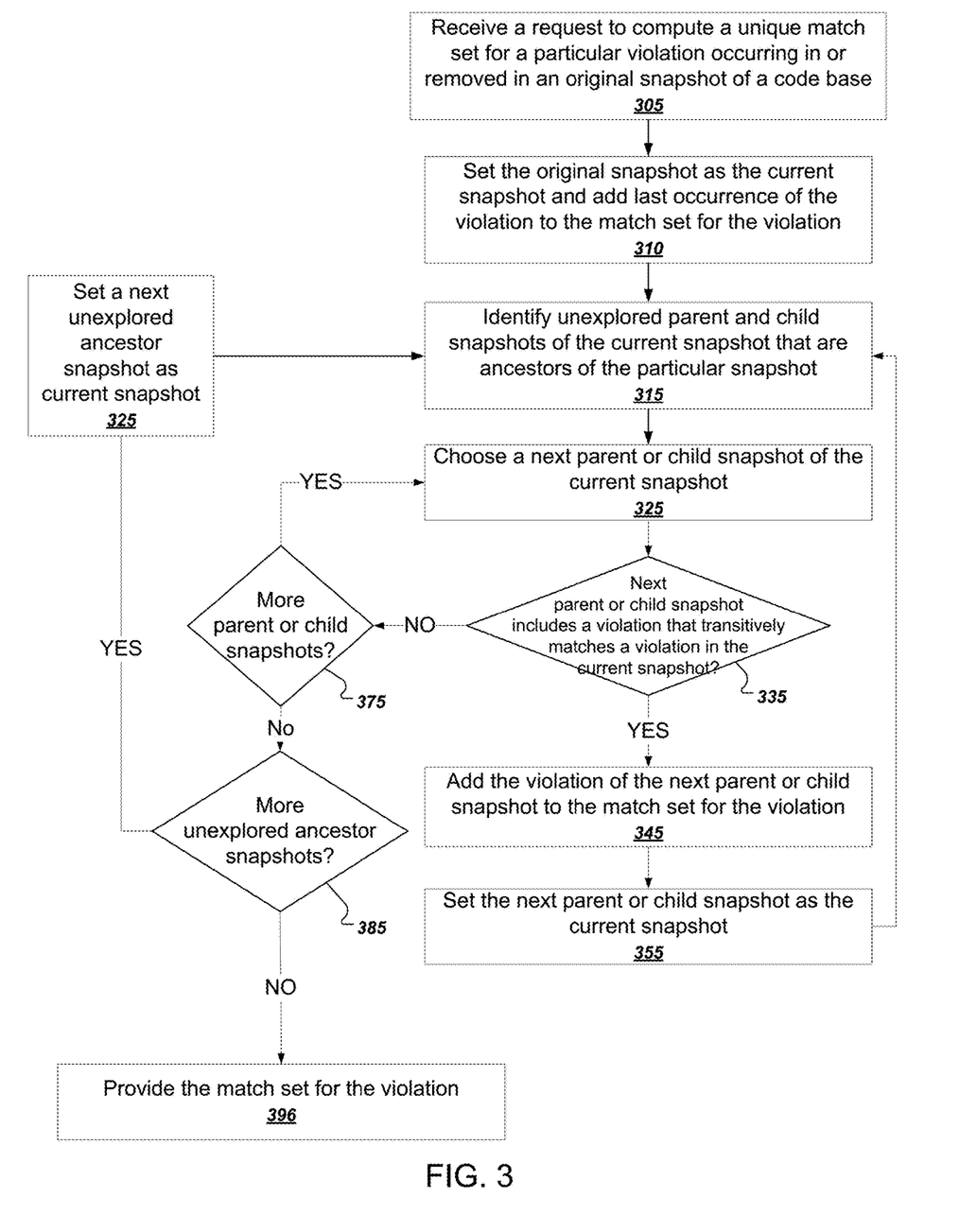
FIG. 3 is a flow chart of an example process for computing a unique match set for a violation.

In those cases, the system can identify all violations in ancestor snapshots that belong to a match set. An example process for doing so is illustrated in FIG. 3. FIG. 3 describes performing a search through the revision graph to identify violations in a match set. The system can also perform any other appropriate searching technique to identify violations in ancestor snapshots that should belong to the match set.

FIG. 3 is a flowchart of an example process for computing a match set for a violation. The process can be implemented by one or more computer programs installed on one or more computers. The process will be described as being performed by an appropriately programmed system of one or more computers, e.g., the static analysis system 102 of FIG. 1.

The static analysis system receives a request to compute a match set for a particular violation occurring in or removed in an original snapshot of a code base (305). In general, the system will process all ancestor snapshots in all branches that were eventually merged back into the original snapshot. Therefore, the system need not search branches that were never merged back into the particular snapshot. In this context, "original" indicates the snapshot related to the request rather than anything about the snapshots' age. The system can perform the process with respect to any original snapshot in the code base.

A violation removed in the original snapshot means that the first violation in the match set actually occurs in a parent of the original snapshot rather than in the original snapshot itself. Therefore, the system will choose one or more of the violations occurring in one or more parent snapshots as a starting point for building the match set.

The system sets the original snapshot as the current snapshot and adds a last occurrence of the violation to the match set for the violation (310). If the violation occurs in the original snapshot, the last occurrence is the particular violation. If the violation was removed in the original snapshot, the last occurrences include occurrences of the violation in the parent snapshots.

In the example flow chart, the designation of "current" is used to denote a placeholder for a snapshot currently being processed to identify violations belonging to the match set. The system can perform the process for any snapshot in the code base, and the "current" snapshot need not be a most recent snapshot in the code base.

The system begins a recursive process for finding violations in ancestor snapshots that transitively match the violation occurring in the current snapshot or transitively match the violation removed in the current snapshot.

The static analysis identifies unexplored parent and child snapshots of the current snapshot that are ancestors of the original snapshot (315). The parent snapshots are the direct ancestor snapshots of the current snapshot. The child snapshots are the direct descendants of the current snapshot. Each of the identified snapshots must, however, be a snapshot that was eventually merged back into the original snapshot of the code base. In other words, the system need not explore unrelated feature branches that do not contribute to the original snapshot.

The system chooses a next parent or child snapshot of the current snapshot (325). For the current snapshot, the system can iterate through all parent snapshots and child snapshots, so long as the snapshots are ancestors of the original snapshot. In this step, the system can select any appropriate parent snapshot or child snapshot that has not yet been processed.

The system determines whether the parent or child snapshot has a violation that transitively matches a violation in the current snapshot (335). Note that the first iteration can present a special case if the violation was removed in the original snapshot. In that case, the violations in the parent will not match any violations in the original snapshot. Therefore, the system can consider a violation to transitively match anyway if, on the first iteration, the violation is a last occurrence of the violation before being removed in the original snapshot. For all other iterations, the system can determine whether the violation transitively matches in the normal sense of transitive matching.

In some cases, the violation matching relationships are not symmetric, which means that A matching B usually, but does not necessarily, imply that B matches A. Thus, when processing child snapshots, the system can simply preserve the matching order by determining whether a violation in the current snapshot matches a violation in the child snapshot, rather than the other way around.

The system can alternatively be more aggressive when building the match sets by determining whether a parent or child snapshot includes a violation that matches any violation in the match set, rather than just a violation occurring in the current snapshot.

If the parent snapshot or child does have a violation matching a violation in the current snapshot, the system adds the violation to the match set for the particular violation (branch to 345). If the violation already occurs in the match set, the system need not add the violation to the match set. This can occur, for example, if there are multiple paths in the revision graph from the violation in the parent snapshot to the particular violation in the original snapshot.

If the violation already occurs in a different match set, the system can merge the match sets. For example, a first branch of the revision graph can include a sequence of transitively matching violations $V_1$->$V_2$->$V_3$. The revision containing $V_1$, however, may multiple children such that a second branch includes a sequence of transitively matching violations $V_1$->$V_4$->$V_5$. When the system encounters $V_1$ for the first time, the match set will include the violations for only one of the branches, e.g., $\{V_1, V_2, V_3\}$. But when the system encounters $V_1$ for the second time, the system will have generated a second match set $\{V_1, V_4, V_5\}$. Thus, the system can merge the match sets to generate $\{V_1, V_2, V_3, V_4, V_5\}$.

The system sets the parent or child snapshot as the current snapshot (355) and again identifies unexplored parent and child snapshots of the current snapshot (315). If the parent or child snapshot does not have a violation that transitively matches a violation in the current snapshot, the system determines whether more parent snapshots of the current snapshot remain to be processed (branch to 375). If so, the system chooses a next parent snapshot to process (branch to 325).

If there are no more parent or child snapshots of the current snapshot, the system determines whether there are more unexplored ancestor snapshots of the original snapshot (385). If using recursive programming techniques, the system can pop up one or more levels of recursion.

If more unexplored ancestor snapshots remain to be processed, the system sets the next unexplored ancestor snapshot as the current snapshot (branch to 325) and restarts the process by identifying unexplored parent and child snapshots of the current snapshot (315).

If no more unexplored ancestor snapshots of the original snapshot remain to be processed, this means that the system has identified all violations in all ancestor snapshots that transitively match the particular violation. Therefore, the system provides the unique match set for the violation (branch to 396).

Additionally, or alternatively, the static analysis system can compute transitively matched violations to a particular violation of a snapshot by independently traversing all branches contributing to the current snapshot. For example, the current snapshot may be revision $R_8$ of a master branch and the parent of revision $R_8$ is revision $R_7$ which has a parent from the master branch, revision $R_6$, and a parent from a child branch, $CBR_4$. The system will continue traversing revisions on the master branch to determining one set of transitively matched violations and the system will also traverse the child branch starting at $CBR_4$ to determine a second set of transitively matched violations for the violation. Assuming that there is only one branch from master, to compute the match set for the violation, the system combines the two transitively matched sets, one from the master branch and one from the child branch, to produce the match set.

The system determines, for each match set, whether the particular developer is responsible for any status change point of the match set (230). A status change point can be an introduction of a violation belonging to a match set or a removal of a violation belonging to a match set.

Thus, if a violation in the match set is introduced by the developer in a snapshot S, the introduction in S is an introduction point for which the developer is responsible. If the particular developer is responsible for introducing any violation in the match set, the system attributes a single violation introduction to the developer. This is the case even if the developer was responsible for multiple introduction points for multiple violations in the match set.

A status change point can also be the removal of a violation that belongs to the match set. Thus, if a violation in the match set exists in a snapshot S, and a developer commits a child snapshot T that removes the violation in S, the removal in T is a removal point.

If the particular developer is responsible for removing any violation in the match set, the system attributes a single violation removal to the developer. This is the case even if the developer removed multiple instances of the violations in the match set.

If the developer is not responsible for a status change point, e.g. an introduction or a removal point, no status change is attributed to the developer.

The system provides the count of unique match sets for which the developer is responsible for a status change point in response to the request (240). In other words, the system can compute a total count of violation introductions to attribute to the developer by counting all match sets for which the developer was responsible for at least one introduction point. Similarly, the system can compute a total count of violation removals to attribute to the developer by counting all match sets for which the developer was responsible for at least one removal point.

Figure 4:
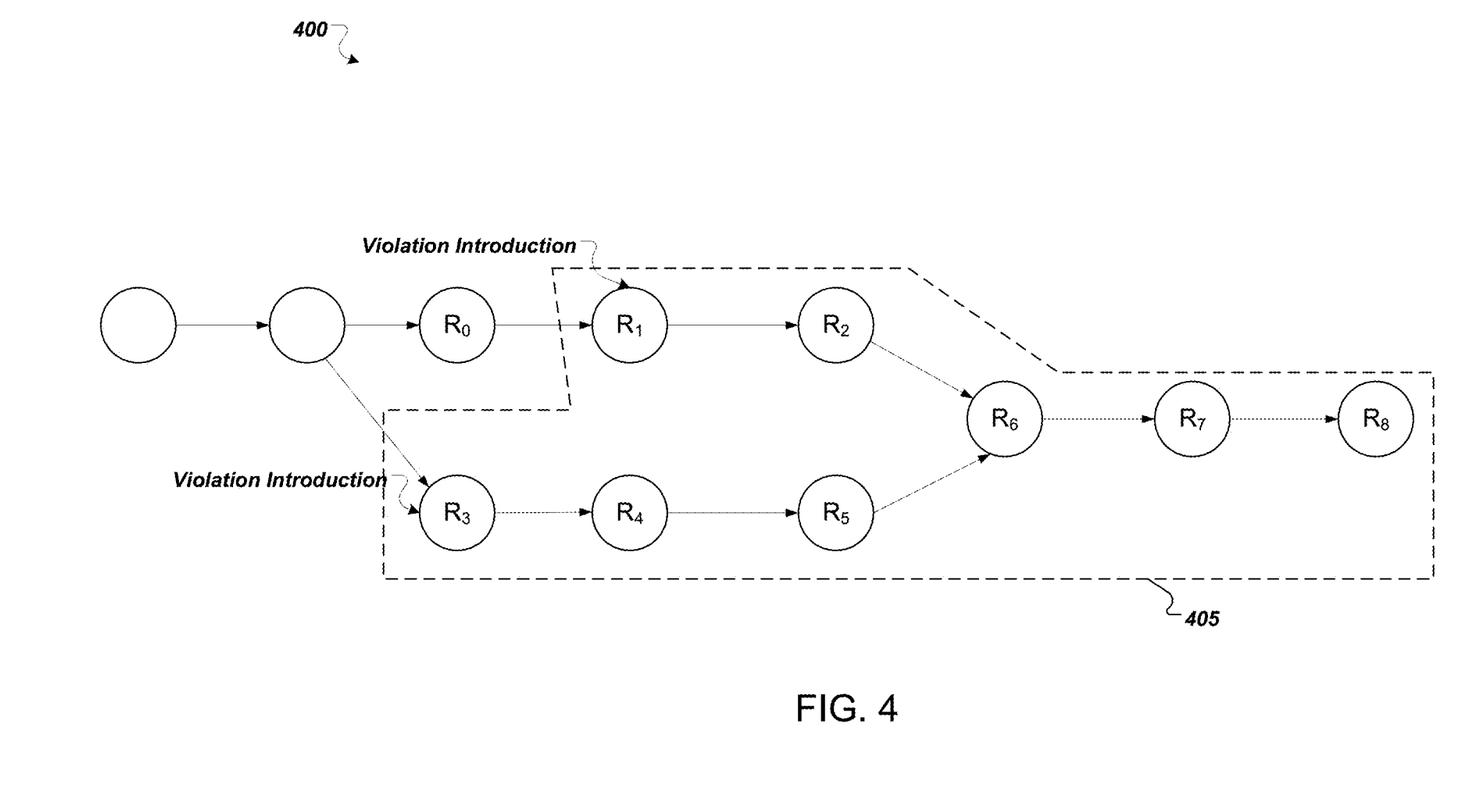
FIG. 4 illustrates an example graph of revisions in a code base across a merge commit.

FIG. 4 illustrates an example graph of revisions in a code base across a merge commit. A first branch includes revisions $R_0$, $R_1$, and $R_2$, and a second branch includes revisions $R_3$, $R_4$, and $R_8$. As illustrated, the second branch is merged into the first branch at revision $R_6$. The first branch has an introduction of a violation at revision $R_1$. The second branch has an introduction of the same or a matching violation at $R_3$. The violation may still exist in the code base at revision $R_8$ such that the violation in $R_8$ is transitively matched to both the introduction point at revision $R_1$ and the introduction point at revision $R_3$.

In this example, each revision $R_0$-$R_8$ has a respective violation $V_{R0}$-$V_{R8}$.

A first violation $V_{R3}$ transitively matches the violation $V_{R8}$. The transitively matching violations occurring in the sequence of snapshots between $R_3$ and $R_8$ thus include: $V_{R8}$, $V_{R7}$, $V_{R6}$, $V_{R5}$, $V_{R4}$, and $V_{R3}$.

A second violation $V_{R1}$ also transitively matches the violation $V_{R8}$. The transitively matching violations occurring in the sequence of snapshots between $R_1$ and $R_8$ thus include: $V_{R8}$, $V_{R7}$, $V_{R6}$, $V_{R2}$, and $V_{R1}$.

A system can then compute the match set as a set union for all the violations that transitively match $V_{R8}$, which is $\{V_{R1}, V_{R2}, V_{R3}, V_{R4}, V_{R5}, V_{R6}, V_{R7}, V_{R8}\}$, which occur in the group of snapshots 405 having violations in the match set.

As illustrated in FIG. 4, one violation occurs in revision $R_8$, which has introduction points at revisions $R_1$ and $R_3$. The match set of this violation is: $\{V_{R1}, V_{R2}, V_{R3}, V_{R4}, V_{R5}, V_{R6}, V_{R7}, V_{R8}\}$. The aggregated new, introduced violations for a particular author A at a given revision R are the match sets for which A is responsible for at least one of the introduction points.

The following definition builds a set union of match sets for violation introductions. The definition is an example of a statement that can be written in a declarative logic programming language and executed by an appropriately programmed evaluation engine to compute the aggregated introduced violations for the author A in a given revision R and its ancestors in a revision graph.

$$AggNew(A, R) = \bigcup_{R' \in Parent^*(R)} \{m \mid \exists v \in New(R') \wedge m = MatchSet(v) \wedge A = Author(R')\}$$

This definition says that if there exists a violation v in a match set ("MatchSet(v)"), and v was introduced ("New (R')") in a revision R' that is an ancestor of R ("R' □ Parent*(R)") for which the author A is responsible ("Author (R')"), the set of match sets will include the match set for v. The system can then compute the number of violations introduced that should be attributed to the author A by computing the number of match sets in the set of match sets.

As shown in FIG. 4, one violation in revision $R_8$ has two introduction points, $R_1$ and $R_3$. In this example, author A is responsible for committing revisions $R_3$, $R_4$, and $R_8$. Therefore, there is a violation $V_{R3}$ that satisfies all three requirements: a) it is an introduction point, b) it is a member of the match set ($\{V_{R1}, V_{R2}, V_{R3}, V_{R4}, V_{R5}, V_{R6}, V_{R7}, V_{R8}\}$), and c) the author A is responsible for the revision that it is found in, $R_3$.

Therefore, for this example, in which the author A was only responsible for $R_3$, the system can attribute, to author A, a single violation introduction corresponding to the match set. The system can also attribute another violation introduction to the author of $R_1$ for a total of two violation introductions.

Next suppose that author A was responsible for both of the introduction points, e.g., at $R_1$ and $R_3$. In that case, the system can still attribute, to the author, just one violation introduction corresponding to the match set. The rationale for this is that the developer may have copied code across branches from $R_1$ to $R_3$. In that case, when both get merged back at $R_6$, they end up being the same violation if they belong to the same match set. Therefore, from the perspective of $R_8$ for which the match set was computed, author A has really only introduced one violation rather than two.

But if another developer was independently responsible for the second introduction, the system still correctly counts that event as a violation introduced by that developer. This behavior is common in code bases with many developers, in which one developer copies code (and all its violations) from one part of the code base to another while working on different branches.

Figure 5:
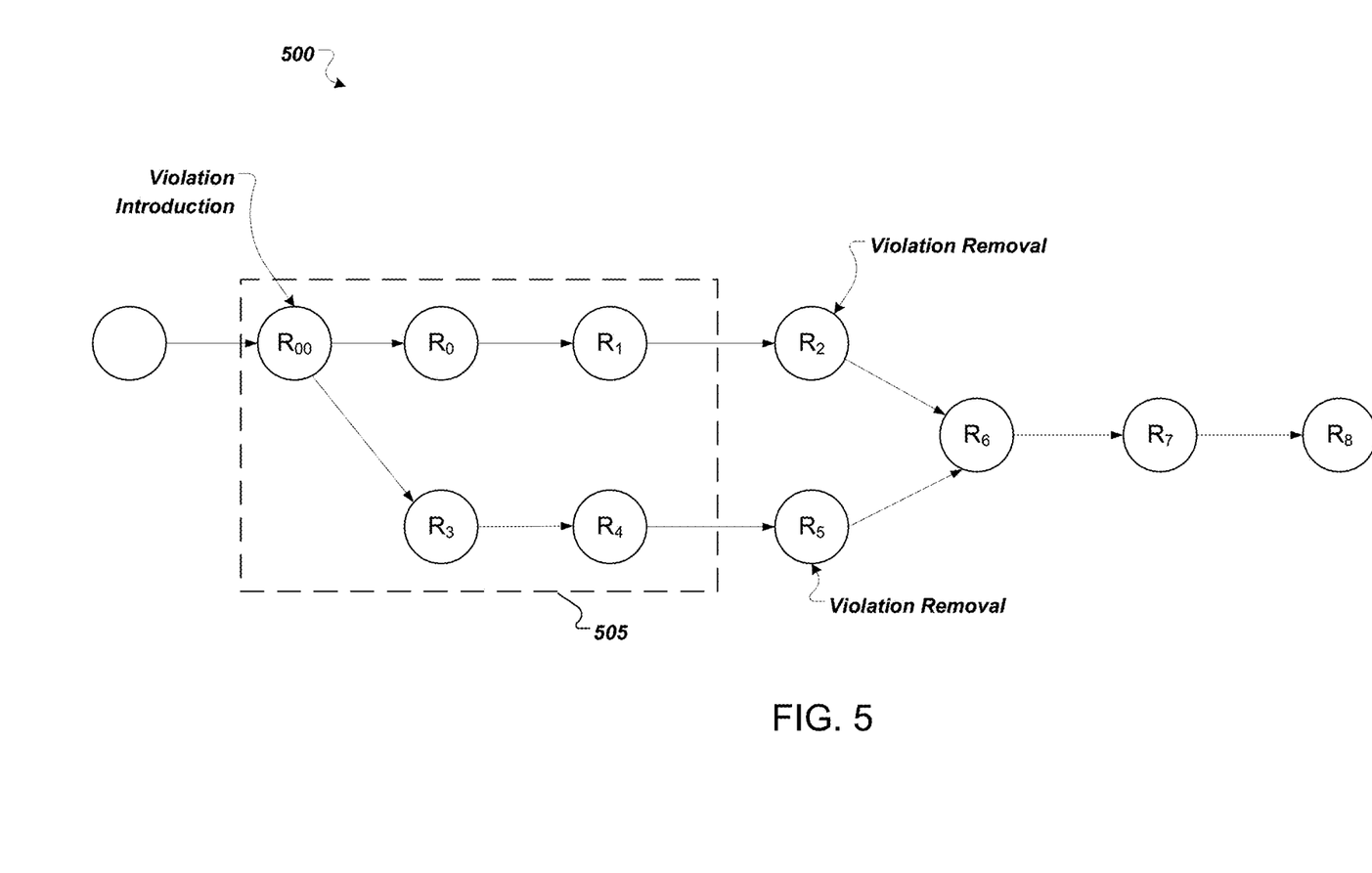
FIG. 5 illustrates an example graph of revisions in a code base across a branch.

FIG. 5 illustrates an example graph of revisions in a code base across a branch. A violation introduced in a first branch at revision $R_{00}$ is subsequently removed in a first branch at revision $R_2$ and in a second branch at revision $R_8$. A static analysis system can determine any developers who should be credited with a violation removal at revision $R_6$ by computing a match set for the violation. The transitively matching violations on the first branch are: $V_{R1}, V_{R0}, V_{R00}$. The transitively matching violations on the second branch are: $V_{R4}, V_{R3}, V_{R00}$. The system can then compute the following match set: $\{V_{R00}, V_{R0}, V_{R1}, V_{R3}, V_{R4}\}$.

In order to determine the violations that have been removed from the particular snapshot, the static analysis system compares the particular snapshot to one or more parent snapshots of the particular snapshot. For example, as shown in FIG. 5, a violation is introduced at revision $R_{00}$ in a first branch and removed at revision $R_5$ in a second branch. The static analysis system can determine that there is a removal in revision $R_5$ by comparing the revision $R_5$ with its parent snapshot in $R_4$. Ancestor revision $R_4$ has the violation that does not match any violations in $R_8$. Therefore, the system determines that the violation in $R_4$ was removed in $R_8$. Similarly, the system can determine that a violation occurring in $R_1$ does not match any violations occurring in $R_2$. Therefore, the system can determine that the violation in $R_1$ was removed in $R_2$.

The system can compute a match set for each violation that was removed in ancestors of $R_8$. In this case, the match set for the violation that was introduced in $R_{00}$ is: $\{V_{R00}, V_{R0}, V_{R1}, V_{R3}, V_{R4}\}$.

For this match set, there is a removal point at $R_5$ and a second removal point at $R_2$. The aggregated fixed violations, for a particular author A at a given revision R are the match sets in the ancestors of R for which A is responsible for at least one of the removal points.

Therefore, in order to determine whether a particular developer was responsible for the removal of a violation, the system can compute a number of unique match sets for which the particular developer was responsible for at least one removal point.

The following definition builds a set union of match sets for violation removals. The definition is another example of a statement that can be written in a declarative logic programming language and executed by an appropriately programmed evaluation engine to compute the aggregated removed violations for an author A at a given revision R and its ancestors in a revision graph.

$$AggFixed(A, R) = \bigcup_{R' \in Parent^*(R)} \{m \mid \exists v \in Fixed(R') \land m = MatchSet(v) \land A = Author(R')\}$$

This definition says that if there exists a violation v in a match set ("MatchSet(v)"), and v was removed ("Fixed (R')") in a revision R' that is an ancestor of R ("R' □ Parent*(R)") for which the author A is responsible ("Author (R')"), the set of match sets will include the match set for v. The system can then compute the number of violations removed that should be attributed to the author A by computing the number of match sets in the set of match sets.

Assume that the author A was responsible for just one of the removal points, e.g., $R_2$ but not $R_5$. In that case, the system can attribute, to the author A, just one violation removal corresponding to the match set. The system can also attribute another violation removal to the author of $R_5$ for a total of two violation removals.

Next suppose that the author A was responsible for both of the removal points, e.g., $R_2$ and $R_5$. In that case, the system can still attribute, to the author, just one violation removal corresponding to the match set. One rationale for doing this is to discourage unproductive or abusive behavior. For example, without this technique a developer could easily manipulate attribution statistics by forking many branches (which, in themselves do not result in the developer incurring any violation introductions), fixing the same violation many times in all the branches, and then merging them all back together. Without match sets, the developer would get credit for fixing each of those duplicate violations. But when using match sets, the system correctly attributes just a single violation removal for this behavior. And if other developers independently fix the violation, the system also gives them credit appropriately.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving a request to compute a number of violation introductions attributable to a particular developer entity in a plurality of ancestor snapshots of an original snapshot in a revision graph of a code base;
computing a respective match set for each of a plurality of violations occurring in the plurality of ancestor snapshots of the original snapshot, wherein each match set for a particular violation in a particular snapshot includes any transitively matching violations in the ancestor snapshots of the particular snapshot that transitively match the particular violation;
computing a count of unique match sets having at least one violation that was introduced by the particular developer entity; and
providing the number of unique match sets in response to the request.

Embodiment 2 is the method of embodiment 1, wherein the plurality of ancestor snapshots of the original snapshot occur in multiple branches of the revision graph.

Embodiment 3 is the method of any one of claims 1-2, further comprising determining, for each violation in each match set, whether the violation was introduced by the particular developer entity including determining whether the violation has any matching violations in an ancestor snapshot.

Embodiment 4 is the method of any one of embodiments 1-3, further comprising:
determining that for a particular match set the particular developer entity was responsible for multiple violation introductions; and
in response, attributing a single violation introduction to the particular developer entity.

Embodiment 5 is the method of any one of embodiments 1-4, further comprising:
determining that for a particular match set multiple developer entities were each responsible for at least one respective violation introduction; and
in response, attributing a single violation introduction to each of the multiple developer entities.

Embodiment 6 is the method of embodiment 5, wherein determining that for a particular match set multiple developer entities were each responsible for at least one respective violation introduction comprises determining that a first developer entity was responsible for multiple violation introductions and a second developer entity was responsible for a single violation introduction; and in response, attributing a single violation introduction to each of the multiple developer entities.

Embodiment 7 is the method of any one of embodiments 1-6, wherein the original snapshot is a most recent snapshot of a code base.

Embodiment 8 is a method comprising:

one or more computers and one or more storage devices storing instructions that are operable, when executed by the one or more computers, to cause the one or more computers to perform operations comprising:

receiving a request to compute a number of violation removals attributable to a particular developer entity in a plurality of ancestor snapshots of an original snapshot in a revision graph of a code base;

computing a respective match set for each of a plurality of violations occurring in the plurality of ancestor snapshots of the original snapshot, wherein each match set for a particular violation in a particular snapshot includes first violations in the ancestor snapshots that transitively match the particular violation and any other violations that the first violations transitively match;

computing a count of unique match sets having at least one violation that was removed by the particular developer entity; and providing the number of unique match sets in response to the request.

Embodiment 9 is the method of embodiment 8, wherein the plurality of ancestor snapshots of the original snapshot occur in multiple branches of the revision graph.

Embodiment 10 is the method of any one of embodiments 8-9, further comprising determining, for each violation in each match set, whether the violation was removed by the particular developer entity including determining whether the violation has any matching violations in an child snapshot.

Embodiment 11 is the method of any one of embodiments 8-10, further comprising:

determining that for a particular match set the particular developer entity was responsible for multiple violation removals; and in response, attributing a single violation removal to the particular developer entity.

Embodiment 12 is the method of any one of embodiments 8-11, further comprising:

determining that for a particular match set multiple developer entities were each responsible for at least one respective violation removal; and in response, attributing a single violation removal to each of the multiple developer entities.

Embodiment 13 is the method of claim 12, wherein determining that for a particular match set multiple developer entities were each responsible for at least one respective violation removal comprises determining that a first developer entity was responsible for multiple violation removals and a second developer entity was responsible for a single violation removal; and in response, attributing a single violation removal to each of the multiple developer entities.

Embodiment 14 is the method of any one of embodiments 8-13, wherein the original snapshot is a most recent snapshot of a code base.

Embodiment 15 is a method comprising:

receiving a request to compute a number of violation status changes attributable to a particular developer entity in a plurality of ancestor snapshots of an original snapshot in a revision graph of a code base;

computing a respective match set for each of a plurality of violations occurring in the plurality of ancestor snapshots of the original snapshot, wherein each match set for a particular violation in a particular snapshot includes any transitively matching violations in the ancestor snapshots of the particular snapshot that transitively match the particular violation;

computing a count of unique match sets having at least one violation whose status was changed by the particular developer entity; and providing the number of unique match sets in response to the request.

Embodiment 16 is the method of embodiment 15, wherein the plurality of ancestor snapshots of the original snapshot occur in multiple branches of the revision graph.

Embodiment 17 is the method of any one of embodiments 15-16, further comprising:

determining that for a particular match set the particular developer entity was responsible for multiple violation status changes; and in response, attributing a single violation status change to the particular developer entity.

Embodiment 18 is the method of any one of embodiments 15-17, further comprising:

determining that for a particular match set multiple developer entities were each responsible for at least one respective violation status change; and in response, attributing a single violation status change to each of the multiple developer entities.

Embodiment 19 is the method of any one of embodiments 15-18, wherein the violation status changes are violation introductions or violation removals.

Embodiment 20 is the method of any one of embodiments 15-19, wherein the original snapshot is a most recent snapshot of a code base.

Embodiment 21 is a system comprising: one or more computers and one or more storage devices storing instructions that are operable, when executed by the one or more computers, to cause the one or more computers to perform the method of any one of embodiments 1 to 20.

Embodiment 22 is a computer storage medium encoded with a computer program, the program comprising instructions that are operable, when executed by data processing apparatus, to cause the data processing apparatus to perform the method of any one of embodiments 1 to 20.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
one or more computers and one or more hardware storage devices storing instructions that are operable, when executed by the one or more computers, to cause the one or more computers to perform operations comprising:
receiving a request to compute a unique match set for one or more violations removed from a code base attributable to a particular developer entity within a plurality of snapshots in a revision graph of a code base, wherein the plurality of snapshots include a plurality of branches of the revision graph, and wherein the plurality of branches of the revision graph are developed in parallel and independently of each other;
identifying a plurality of removals of one or more violations from the code base by comparing parent and corresponding child snapshots in the revision graph of the code base to determine when each violation of the one or more violations is present in a parent snapshot but not present in a corresponding child snapshot of the parent snapshot of the revision graph of the code base, wherein an occurrence of a particular violation in the parent snapshot that is not present in the corresponding child snapshot reflects a removal of the particular violation;
executing a recursive process to find violation removals occurring in the plurality of snapshots to compute a respective match set for each removal of the identified plurality of removals of the one or more violations from the code base, wherein the respective match set includes a first removal of a particular violation from a first branch of the plurality of branches of the revision graph and a second removal of the particular violation from a second branch of the plurality of branches of the revision graph;
computing a count of unique match sets for each removal of the identified plurality of removals of the one or more violations from the code base that was removed by a particular developer entity, by at least determining the particular developer entity is responsible for both the first removal of the particular violation and the second removal of the particular violation and by attributing the first removal of the particular violation and the second removal of the particular violation as only a single violation removal by the particular developer entity; and
providing the count of unique match sets in response to the request to compute the unique match set for the one or more violations removed from the code base attributable to the particular developer entity.

2. The system of claim 1, wherein the operations further comprise:
determining that, for a particular match set, that multiple developer entities were each responsible for at least one respective violation removal; and
in response to determining that, for the particular match set, that multiple developer entities were each responsible for the at least one respective violation removal, attributing a single violation removal to each developer entity of the multiple developer entities.

3. The system of claim 1, wherein the parent and corresponding child snapshots in the revision graph of the code base are all ancestor snapshots to a target snapshot that is a most recent snapshot of the code base.

4. A method implemented by a computing system, the method comprising:
receiving a request to compute a unique match set for one or more violations removed from a code base attributable to a particular developer entity within a plurality of snapshots in a revision graph of a code base, wherein the plurality of snapshots include a plurality of branches of the revision graph, and wherein the plurality of branches of the revision graph are developed in parallel and independently of each other;
identifying a plurality of removals of one or more violations from the code base by comparing parent and corresponding child snapshots in the revision graph of the code base to determine when each violation of the one or more violations is present in a parent snapshot but not present in a corresponding child snapshot of the parent snapshot of the revision graph of the code base, wherein an occurrence of a particular violation in the parent snapshot that is not present in the corresponding child snapshot reflects a removal of the particular violation;
executing a recursive process to find violation removals occurring in the plurality of snapshots to compute a respective match set for each removal of the identified plurality of removals of the one or more violations from the code base, wherein the respective match set includes a first removal of a particular violation from a first branch of the plurality of branches of the revision graph and a second removal of the particular violation from a second branch of the plurality of branches of the revision graph;
computing a count of unique match sets for each removal of the identified plurality of removals of the one or more violations from the code base that was removed by a particular developer entity, by at least determining the particular developer entity is responsible for both the first removal of the particular violation and the second removal of the particular violation and by attributing the first removal of the particular violation and the second removal of the particular violation as only a single violation removal by the particular developer entity; and
providing the count of unique match sets in response to the request to compute the unique match set for the one or more violations removed from the code base attributable to the particular developer entity.

5. The method of claim 4, wherein the operations further comprise:
- determining that, for a particular match set, that multiple developer entities were each responsible for at least one respective violation removal; and
- in response to determining that, for the particular match set, that multiple developer entities were each responsible for the at least one respective violation removal, attributing a single violation removal to each developer entity of the multiple developer entities.

6. The method of claim 4, wherein the parent and corresponding child snapshots in the revision graph of the code base are all ancestor snapshots to a target snapshot that is a most recent snapshot of the code base.

7. One or more hardware storage devices storing instructions that are operable, when executed by one or more computers, to cause the one or more computers to perform operations comprising:
- receiving a request to compute a unique match set for one or more violations removed from a code base attributable to a particular developer entity within a plurality of snapshots in a revision graph of a code base, wherein the plurality of snapshots include a plurality of branches of the revision graph, and wherein the plurality of branches of the revision graph are developed in parallel and independently of each other;
- identifying a plurality of removals of one or more violations from the code base by comparing parent and corresponding child snapshots in the revision graph of the code base to determine when each violation of the one or more violations is present in a parent snapshot but not present in a corresponding child snapshot of the parent snapshot of the revision graph of the code base, wherein an occurrence of a particular violation in the parent snapshot that is not present in the corresponding child snapshot reflects a removal of the particular violation;
- executing a recursive process to find violation removals occurring in the plurality of snapshots to compute a respective match set for each removal of the identified plurality of removals of the one or more violations from the code base, wherein the respective match set includes a first removal of a particular violation from a first branch of the plurality of branches of the revision graph and a second removal of the particular violation from a second branch of the plurality of branches of the revision graph;
- computing a count of unique match sets for each removal of the identified plurality of removals of the one or more violations from the code base that was removed by a particular developer entity, by at least determining the particular developer entity is responsible for both the first removal of the particular violation and the second removal of the particular violation and by attributing the first removal of the particular violation and the second removal of the particular violation as only a single violation removal by the particular developer entity; and
- providing the count of unique match sets in response to the request to compute the unique match set for the one or more violations removed from the code base attributable to the particular developer entity.

8. The one or more hardware storage devices of claim 7, wherein the operations further comprise:
- determining that, for a particular match set, that multiple developer entities were each responsible for at least one respective violation removal; and
- in response to determining that, for the particular match set, that multiple developer entities were each responsible for the at least one respective violation removal, attributing a single violation removal to each developer entity of the multiple developer entities.

9. The one or more hardware storage devices of claim 7, wherein the parent and corresponding child snapshots in the revision graph of the code base are all ancestor snapshots to a target snapshot that is a most recent snapshot of the code base.

* * * * *